(No Model.)
E. F. ESTES.
TYPE WRITING MACHINE.
No. 471,964. Patented Mar. 29, 1892.
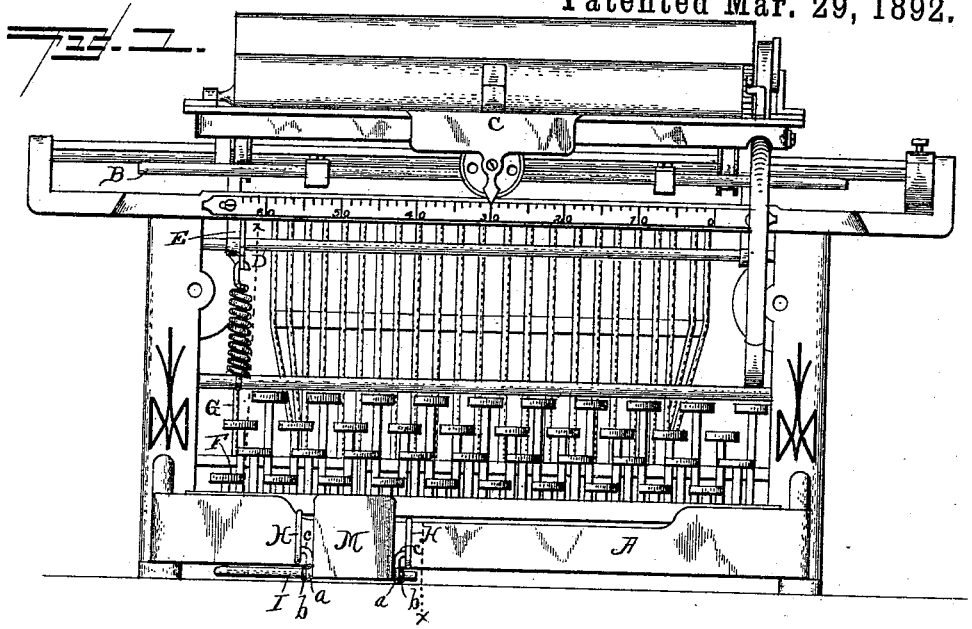
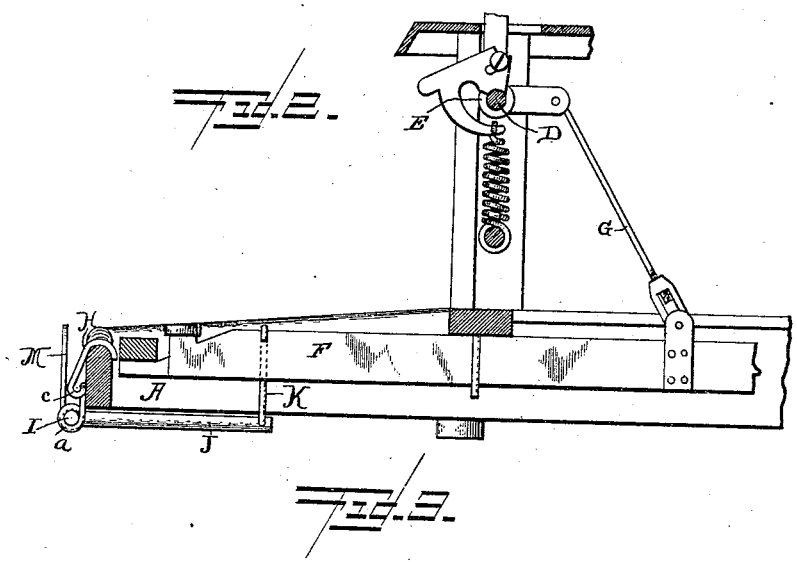
WITNESSES
C. S. Frye
Thomas E. Turpin
E. F. Estes,
INVENTOR;
By W. T. Fitzgerald
Attorneys.

UNITED STATES PATENT OFFICE.

ELMER F. ESTES, OF LINCOLN, NEBRASKA.

TYPE-WRITING MACHINE.

SPECIFICATION forming part of Letters Patent No. 471,964, dated March 29, 1892.

Application filed January 14, 1892. Serial No. 418,067. (No model.)

*To all whom it may concern:*

Be it known that I, ELMER F. ESTES, a citizen of the United States, residing at Lincoln, in the county of Lancaster and State of Nebraska, have invented certain new and useful Improvements in Type-Writer Attachments; and I do hereby declare the following to be a full, clear, and exact description of the invention, such as will enable others skilled in the art to which it appertains to make and use the same.

My invention has relation to improvements in type-writing machines; and it has for its general object to provide mechanism through the medium of which the "upper-case" key-bar or the "lower-case" bar may be readily manipulated by the left thumb of the operator.

A further object of the invention is to provide mechanism for the purpose stated of such a construction that it may be readily connected to and as readily removed from a machine without the employment of skilled labor.

To the attainment of the foregoing and other objects the invention consists in the peculiar construction, certain novel combinations, and the adaptation of parts hereinafter described, and particularly pointed out in the claims appended.

In the accompanying drawings I have illustrated my invention in conjunction with the upper-case key-bar and carriage-shifting mechanism of what is known as the "Remington" type-writer; but, as is obvious, I do not desire to be confined to such application, as my improvements may be employed to an advantage upon any type-writer in which the change from lower-case to upper-case, or vice versa, is effected through the medium of a key bar or bars.

Referring to the drawings, Figure 1 is a front elevation of a type-writer, illustrating the application of my improvements. Fig. 2 is a vertical transverse section of the type-writer, taken in the plane indicated by the line $x\ x$ on Fig. 1, my improvements being illustrated in side elevation; and Fig. 3 is a perspective view of my improved mechanism removed.

In the said drawings similar letters designate corresponding parts throughout the several views, referring to which—

A indicates the main frame of what is known as the "Remington" machine, in the upper forward portion of which is journaled a transverse slide-bar B, to which is connected the forwardly and rearwardly movable carriage C. Journaled in the main frame beneath the bar B is a transverse rock-shaft D, upon which is fixedly mounted a bell-crank lever E, which has one of its branches connected to the slide-bar B, while its other branch is connected to the upper-case key-bar F through the medium of a pitman G, as illustrated, whereby it will be perceived that when said key-bar is depressed in a vertical plane the carriage C will be shifted rearwardly, so as to receive the impact of the upper-case type.

Detachably connected to the lower front cross-bar of the main frame A by hanger-hooks H is a rock-shaft I, which is provided with an inwardly-directed branch J, adjacent to the forward end of which is connected a pitman-loop K, which is designed to embrace and be detachably connected to the key-bar F, as better illustrated in Fig. 2 of the drawings, whereby it will be seen that when the said shaft I is rocked in one direction the key-bar will be depressed and the carriage shifted, as before stated.

The hanger-hooks H, which are bent at their upper ends to engage the lower cross-bar of the machine, are provided at or adjacent to their lower ends with eyes $a$ to receive the rock-shaft I, which is preferably provided with collars $b$, as illustrated, to prevent lateral play of the hooks while in use.

Preferably at a point immediately above the eyes $a$ the hanger-hooks H are provided with inwardly and upwardly directed branches $c$, designed to engage the lower front cross-bar of the machine, so as to hold the rock-shaft away from the same.

Fixedly connected to or formed integral with the rock-shaft I and extending upwardly therefrom is the thumb disk or lever M, which is designed to be engaged by the left thumb of the operator and pressed in toward the machine, so as to rock the rock-shaft I, depress the key-bar F, and shift the carriage C through the medium of the mechanism described.

By the provision of mechanism such as described it will be readily perceived that the left thumb may be used to change from lower to upper case, or vice versa, and the right thumb to actuate the spacing-bar, leaving all the fingers of both hands free to manipulate the character-keys.

Although I have specifically illustrated my improved mechanism as detachably connected to the machine, I do not desire to be confined to the same, as when desired the mechanism might form a permanent part of the machine.

Having thus described my invention, what I claim, and desire to secure by Letters Patent, is—

1. In a type-writing machine substantially as described, the combination, with a key-bar adapted when depressed to change the writing from lower-case to upper-case, or vice versa, of the rock-shaft having the inwardly-directed angular branch, the pitman connecting the inner end of said branch and the key-bar, and the thumb disk or lever fixedly connected to the rock-shaft and extending upwardly therefrom, substantially as and for the purpose specified.

2. The combination, with the type-writing machine, substantially as described, having a key-bar adapted when depressed to change the writing from lower-case to upper-case, or vice versa, of the rock-shaft having the inwardly-directed angular branch connected with the key-bar, the thumb disk or lever fixedly connected to the rock-shaft, and the hanger-hooks engaging the lower cross-bar of the machine-frame and having the eyes to receive the rock-shaft, and the inwardly-directed branches adapted to engage the machine-frame and hold the rock-shaft away from the same, substantially as specified.

3. The improved mechanism described, comprising the rock-shaft having the inwardly-directed branch, the pitman-loop for connecting said branch to the carriage-shifting key-bar of a type-writing machine, the thumb disk or lever fixedly connected to and extending upwardly from the rock-shaft, and the hanger-hooks adapted to engage the lower cross-bar of a type-writer frame and having eyes to receive the rock-shaft, substantially as specified.

4. In a type-writing machine, the combination, with the main frame, the rock-shaft, and the thumb disk or lever fixedly connected to and extending upwardly from the rock-shaft, of the hanger-hooks adapted to engage the frame and having eyes to receive the rock-shaft, substantially as specified.

In testimony whereof I affix my signature in presence of two witnesses.

ELMER F. ESTES.

Witnesses:
W. E. PAINTER,
A. F. WALSH.